(12) United States Patent
Hu et al.

(10) Patent No.: US 12,504,598 B2
(45) Date of Patent: Dec. 23, 2025

(54) OPTICAL ELEMENT DRIVING MECHANISM

(71) Applicant: TDK TAIWAN CORP., Taoyuan (TW)

(72) Inventors: Chao-Chang Hu, Taoyuan (TW);
Chao-Hsi Wang, Taoyuan (TW);
Shu-Shan Chen, Taoyuan (TW);
He-Ling Chang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 938 days.

(21) Appl. No.: 17/541,726

(22) Filed: Dec. 3, 2021

(65) Prior Publication Data
US 2022/0179166 A1    Jun. 9, 2022

Related U.S. Application Data

(60) Provisional application No. 63/121,415, filed on Dec. 4, 2020.

(51) Int. Cl.
*G02B 7/02* (2021.01)
*G01D 5/14* (2006.01)
(Continued)

(52) U.S. Cl.
CPC .............. *G02B 7/02* (2013.01); *G01D 5/14* (2013.01); *G02B 7/09* (2013.01); *G02B 26/08* (2013.01);
(Continued)

(58) Field of Classification Search
CPC ...... G02B 27/646; G02B 6/3514; G02B 7/08; G02B 7/09; G02B 7/182; G02B 15/173;
(Continued)

(56) References Cited

U.S. PATENT DOCUMENTS

2010/0271916 A1* 10/2010 Oida ................. G11B 7/13927
2016/0313683 A1* 10/2016 Nishizawa ......... G03G 15/2042
(Continued)

FOREIGN PATENT DOCUMENTS

CN         1912670 A       2/2007
JP      2006288166 A      10/2006

OTHER PUBLICATIONS

An Office Action in corresponding CN Application No. 202111466071.7 issued Jul. 17, 2025 is attached, 4 pages.

*Primary Examiner* — Stephone B Allen
*Assistant Examiner* — Tamara Y. Washington
(74) *Attorney, Agent, or Firm* — MUNCY, GEISSLER, OLDS & LOWE, P.C.

(57) ABSTRACT

The present disclosure provides an optical element driving mechanism, which includes a movable part, a fixed assembly, a first driving assembly and a guiding assembly. The movable part is configured to be connected to an optical element. The fixed assembly has an accommodating space, and the movable part is partially disposed in the accommodating space and is movable relative to the fixed assembly. The first driving assembly is configured to drive the movable part to move relative to the fixed assembly. The guiding assembly is configured to guide the movable part to move along a first axis relative to the fixed assembly. There is no elastic element disposed between the movable part and the fixed assembly.

20 Claims, 13 Drawing Sheets

(51) Int. Cl.
*G02B 7/09* (2021.01)
*G02B 26/08* (2006.01)
*G03B 9/10* (2021.01)
*G03B 9/40* (2021.01)
*G03B 11/04* (2021.01)
*G03B 30/00* (2021.01)
*H01F 7/08* (2006.01)
*H01F 7/16* (2006.01)
*H04N 23/54* (2023.01)
*H04N 23/55* (2023.01)

(52) U.S. Cl.
CPC .......... *G03B 9/10* (2013.01); *G03B 9/40* (2013.01); *G03B 11/04* (2013.01); *G03B 30/00* (2021.01); *H01F 7/081* (2013.01); *H01F 7/16* (2013.01); *H04N 23/54* (2023.01); *H04N 23/55* (2023.01); *G03B 11/043* (2013.01)

(58) Field of Classification Search
CPC ...... G02B 15/14; G02B 15/177; G02B 15/22; G02B 15/16; G02B 13/18; G02B 13/009; G02B 27/64; G02B 13/02; G02B 7/04; G02B 13/0015; G02B 15/15; G02B 13/0045; G02B 15/17; G02B 15/20; G02B 27/0025; G02B 9/62; G02B 13/04; G02B 7/023; G02B 9/64; G02B 13/001; G02B 13/0065; G02B 15/10; G02B 15/163; G02B 15/167; G02B 23/02; G02B 7/02; G02B 7/022; G02B 7/102; G02B 7/14; G02B 9/04; G02B 9/34; G02B 9/60; G02B 13/002; G02B 13/004; G02B 13/06; G02B 13/16; G02B 15/12; G02B 15/161; G02B 17/08; G02B 17/0804; G02B 17/0808; G02B 17/0896; G02B 21/26; G02B 23/08; G02B 26/004; G02B 26/0808; G02B 26/0816; G02B 27/0911; G02B 27/644; G02B 3/14; G02B 7/021; G02B 7/025; G02B 7/18; G02B 7/24; G02B 7/28; G02B 9/00; G02B 9/24; H04N 5/23287; H04N 5/2252; H04N 5/2254; H04N 5/2329; H04N 5/2257; H04N 5/2253; H04N 5/23248; H04N 5/2328; H04N 5/225; H04N 5/232; H04N 5/23209; H04N 5/23212; H04N 5/23245; H04N 5/23258; H04N 5/23264; H04N 13/0203; H04N 13/0239; H04N 13/0296; H04N 5/222; H04N 5/228; H04N 5/23229; H04N 5/23251; H04N 5/23254; H04N 5/23261; H04N 5/23274; H04N 5/238; H04N 23/58; H04N 23/687; H04N 23/55; G03B 5/00; G03B 3/00; G03B 3/14; G03B 5/02; G03B 5/06; G03B 2205/0015; G03B 3/10; G03B 2205/0069; G03B 2205/002; G03B 2205/0007; G03B 13/36; G03B 17/02; G03B 17/04; G03B 17/14; G03B 17/12; G03B 2205/0046; G03B 2205/0053; G03B 2205/0092; H02K 41/0356

See application file for complete search history.

(56) References Cited

U.S. PATENT DOCUMENTS

2020/0310079 A1* 10/2020 Park .................. G03B 3/10
2021/0364733 A1* 11/2021 Lee .................. G03B 13/36

* cited by examiner

OPTICAL ELEMENT DRIVING MECHANISM

CROSS REFERENCE TO RELATED APPLICATIONS

This application claims the benefit of U.S. Provisional Application No. 63/121,415, filed on Dec. 4, 2020, the entirety of which is incorporated by reference herein.

BACKGROUND OF THE DISCLOSURE

Field of the Disclosure

The present disclosure relates to an optical element driving mechanism, and in particular it relates to an optical element driving mechanism capable of precisely controlling movement.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choices for consumers.

BRIEF SUMMARY OF THE DISCLOSURE

According to some embodiments of the disclosure, the present disclosure provides an optical element driving mechanism, which includes a movable part, a fixed assembly, a first driving assembly and a guiding assembly. The movable part is configured to be connected to an optical element. The fixed assembly has an accommodating space, and the movable part is partially disposed in the accommodating space and is movable relative to the fixed assembly. The first driving assembly is configured to drive the movable part to move relative to the fixed assembly. The guiding assembly is configured to guide the movable part to move along a first axis relative to the fixed assembly. There is no elastic element disposed between the movable part and the fixed assembly.

According to some embodiments, the optical element driving mechanism further includes a second driving assembly, and the second driving assembly and the first driving assembly are configured to cooperatively drive the movable part to move within an extreme motion range relative to the fixed assembly. The first driving assembly and the second driving assembly are configured to drive the movable part to move in a first direction relative to the fixed assembly. The first driving assembly and the second driving assembly are configured to drive the movable part to move in a second direction relative to the fixed assembly. The first direction and the second direction are both parallel to the first axis.

According to some embodiments, the first direction and second direction are opposite to each other. The first driving assembly and the second driving assembly are configured to drive the movable part to move from a preset position to a target position. The preset position and the target position are within the extreme motion range.

According to some embodiments, the movable part includes a supporting platform configured to hold the optical element. The fixed assembly includes a covering body and a base. The covering body is disposed on the base to form the accommodation space. The guiding assembly includes a first guiding element configured to guide the movable part to move along the first axis relative to the fixed assembly. The first guiding element has a long strip-shaped structure. The first guiding element extends along the first axis. The first guiding element passes through the movable part. The first guiding element is affixed to the base.

According to some embodiments, the guiding assembly further includes a second guiding element configured to guide the movable part to move along the first axis relative to the fixed assembly. The second guiding element is formed on the covering body. The second guiding element has a slot-shaped structure and extends along the first axis. The movable part further includes a base body, and the supporting platform is extended from the base body along a second axis. The second axis is perpendicular to the first axis.

According to some embodiments, when viewed along the first axis, the supporting platform protrudes from the slot-shaped structure. When viewed along a third axis, the supporting platform protrudes from the slot-shaped structure. The third axis is perpendicular to the first axis and the second axis.

According to some embodiments, the guiding assembly further includes a third guiding element configured to guide the movable part to move along the first axis relative to the fixed assembly. The third guiding element is formed on the base. The third guiding element has a slit structure and extends along the first axis.

According to some embodiments, the movable part further includes an extending portion, and the extending portion is extended from the base body along the second axis. When viewed along the third axis, the extending portion does not protrude from the slit structure. When viewed along the third axis, the slit structure overlaps at least a part of the extending portion.

According to some embodiments, the first driving assembly and the second driving assembly are disposed in the accommodation space. The first driving assembly includes: a first coil; a first magnetic element, corresponding to the first coil; and a first magnetically conductive element, corresponding to the first coil. The first magnetic element is disposed on the extending portion. The first coil surrounds the first magnetically conductive element. The first magnetically conductive element has a long strip-shaped structure. The first magnetically conductive element extends along the first axis.

According to some embodiments, the second driving assembly includes: a second coil, corresponding to the first magnetic element; and a second magnetically conductive element, corresponding to the second coil. The second coil surrounds the second magnetically conductive element. The second magnetically conductive element has a long strip-shaped structure. The second magnetically conductive element extends along the first axis. A permeability of the first magnetically conductive element is the same as a permeability of the second magnetically conductive element. The number of turns of the first coil is equal to the number of turns of the second coil.

According to some embodiments, the optical element driving mechanism further includes a first limiting portion and a second limiting portion configured to limit the movable part to move within the extreme motion range. The first limiting portion and the second limiting portion are respectively disposed on a first side and a second side of the base. A first end and a second end of the first guiding element are respectively fixedly disposed on the first limiting portion and the second limiting portion.

According to some embodiments, the optical element driving mechanism further includes a sensing assembly configured to sense a position of the movable part relative to the fixed assembly. The sensing assembly includes a first sensing element disposed on the base and located on the first side. The sensing assembly includes a second sensing element disposed on the base and located on the second side. The first sensing element and the second sensing element are adjacent to the slit structure.

According to some embodiments, when viewed along the second axis, the first guiding element is located between the first coil and the second coil. When viewed along the second axis, the movable part overlaps at least a part of the first coil and the second coil. When viewed along the second axis, the first coil does not overlap the first limiting portion and the second limiting portion. When viewed along the second axis, the second coil does not overlap the first limiting portion and the second limiting portion.

According to some embodiments, when viewed along the first axis, the extending portion is located between the first coil and the second coil. When viewed along the first axis, the first magnetic element is located between the first coil and the second coil.

According to some embodiments, the optical element driving mechanism further includes a first blocking surface and a second blocking surface located on the covering body and configured to be in contact with the supporting platform to prevent the movable part from rotating around the first axis. The optical element driving mechanism further includes a third blocking surface and a fourth blocking surface located on the base and configured to be in contact with the extending portion to prevent the movable part from rotating around the first axis.

According to some embodiments, the optical element driving mechanism further includes a control circuit configured to control the first driving assembly and the second driving assembly. The first driving assembly drives the movable part to start moving from an initial time point. Between the initial time point and a first time point, the control circuit provides a first current to the first coil, and a current value of the first current linearly increases from zero to a first current value. Between the first time point and a second time point, the first current is maintained at the first current value. At the second time point, the movable part moves to a close position. A distance between the close position and the target position is 5 to 10% of the extreme motion range.

According to some embodiments, between the second time point and a third time point, the current value of the first current linearly decreases from the first current value to a second current value. The first current value is at least twice the second current value. At the third time point, the movable part reaches the target position and does not exceed the target position. Between the third time point and a fourth time point, the first current is maintained at the second current value.

According to some embodiments, the control circuit is configured to provide a second current to the second coil. Between the initial time point and the fourth time point, the second current is maintained at a third current value. The third current value and the second current value have the same magnitude, but the phases of the third current value and the second current value are opposite.

According to some embodiments, the second driving assembly drives the movable part to start moving from the initial time point. Between the initial time point and the first time point, the control circuit provides a second current to the second coil, and a current value of the second current linearly increases from zero to the second current value. Between the first time point and a second time point, the second current is maintained at the second current value. Between the second time point and the third time point, the current value of the second current linearly decreases from the second current value to a third current value. Between the third time point and the fourth time point, the second current is maintained at the third current value. The third current value and the second current value have the same magnitude, but the phases of the third current value and the second current value are opposite.

According to some embodiments, after the movable part moves to the target position, the control circuit continues to provide the first current to the first coil, and the first current is maintained at the second current value. After the movable part moves to the target position, the control circuit continues to provide the second current to the second coil, and the second current is maintained at the third current value.

The present disclosure provides an optical element driving mechanism, which includes a movable part, a fixed assembly, a first and a second driving assemblies and a guiding assembly. The movable part is configured to be connected to an optical element. The first and second driving assemblies are configured to drive the movable part to move along the first direction or the second direction relative to the fixed assembly. The guiding assembly is configured to guide the movable part to move along the first axis relative to the fixed assembly.

In the present disclosure, no elastic element is provided between the movable part and the fixed assembly. Furthermore, in some embodiments, the second driving assembly continuously provides a constant second electromagnetic driving force at any time point. Based on this configuration, the second electromagnetic driving force can serve as a spring, and it is not necessary to dispose a physical spring on the moving path of the movable part, so that the moving distance of the movable part can be increased, and the cost can be reduced.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
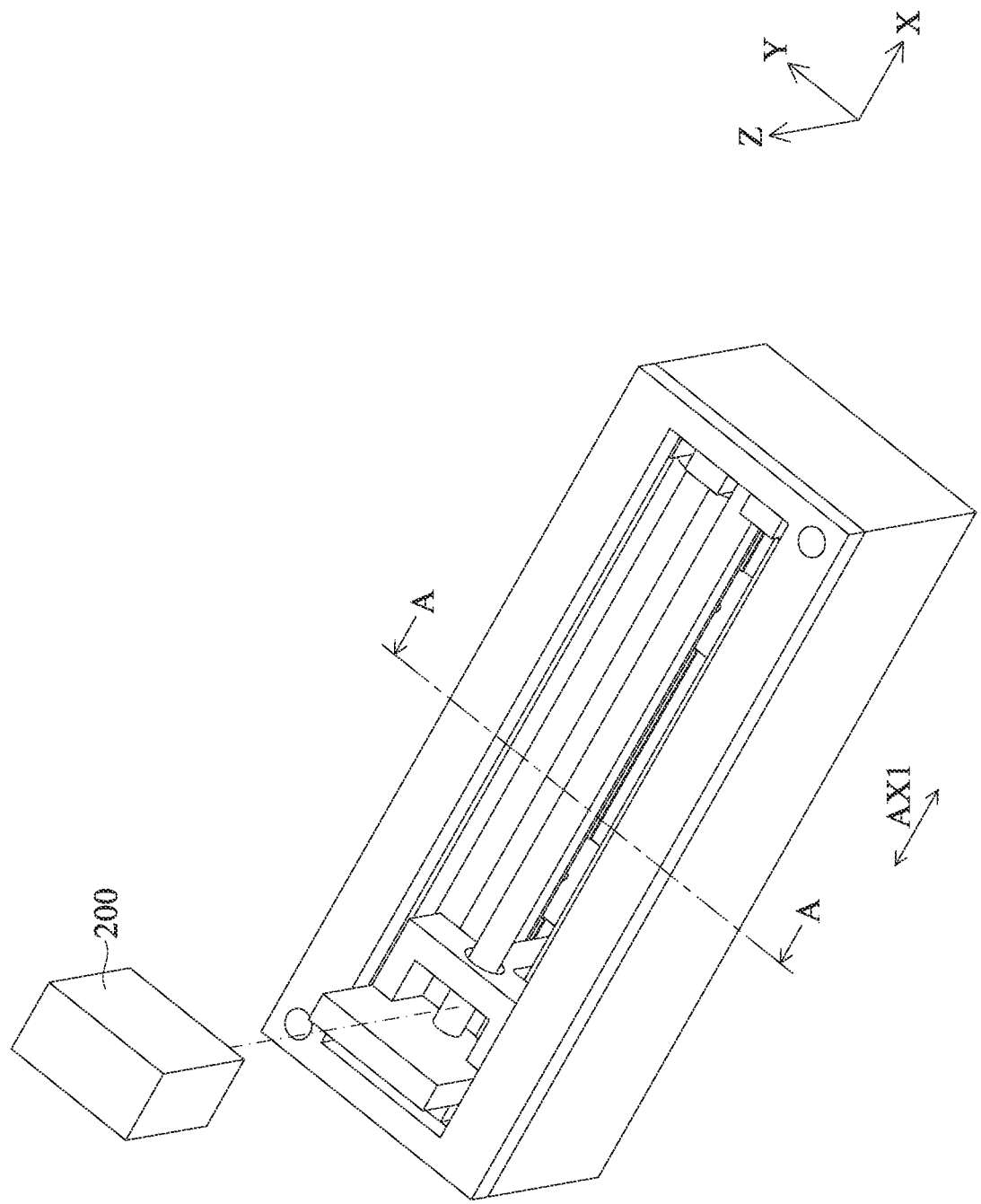
FIG. 1 shows a schematic diagram of an optical element driving mechanism 100 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
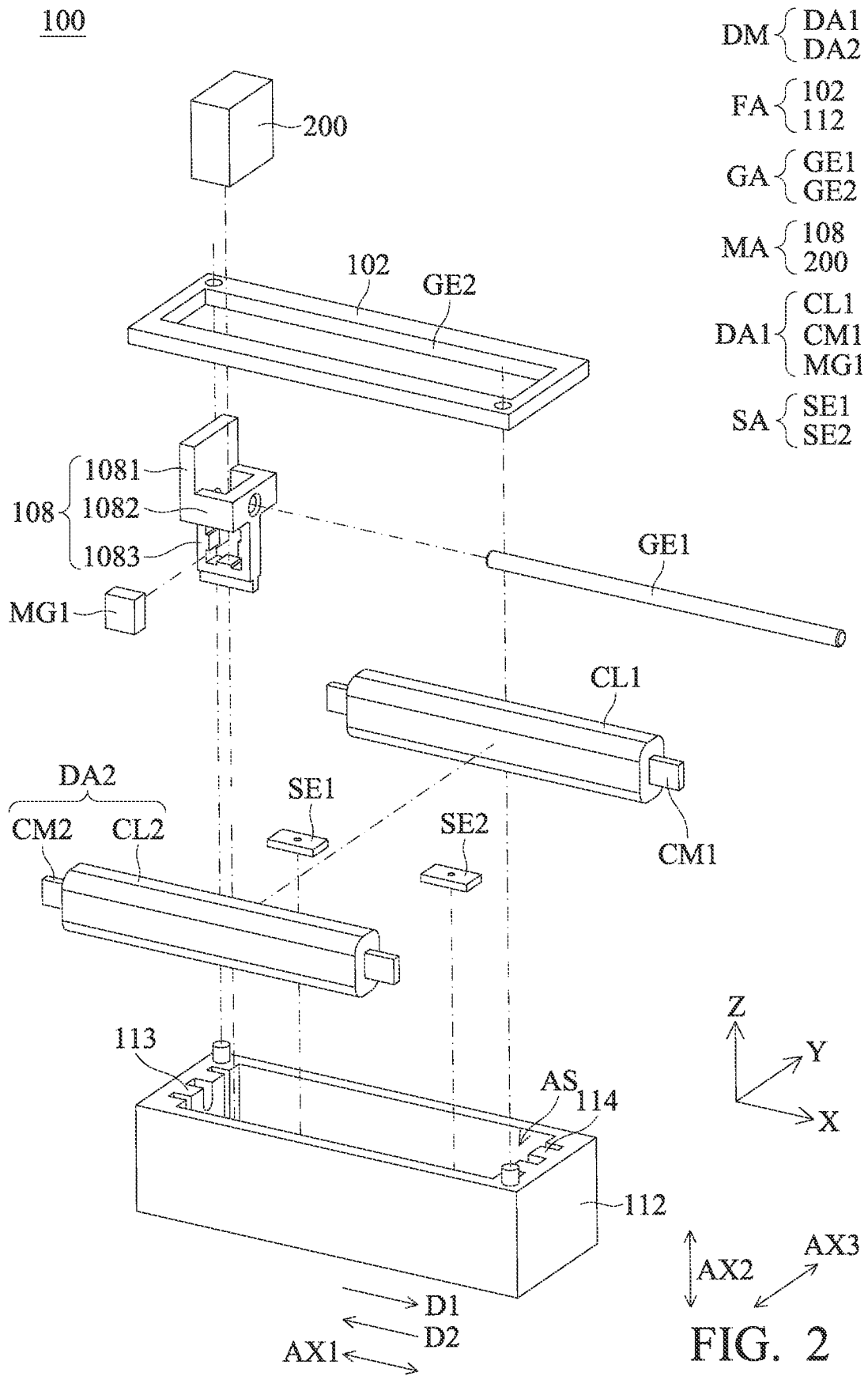
FIG. 2 shows an exploded diagram of the optical element driving mechanism 100 according to the embodiment of the present disclosure.
Figure 3:
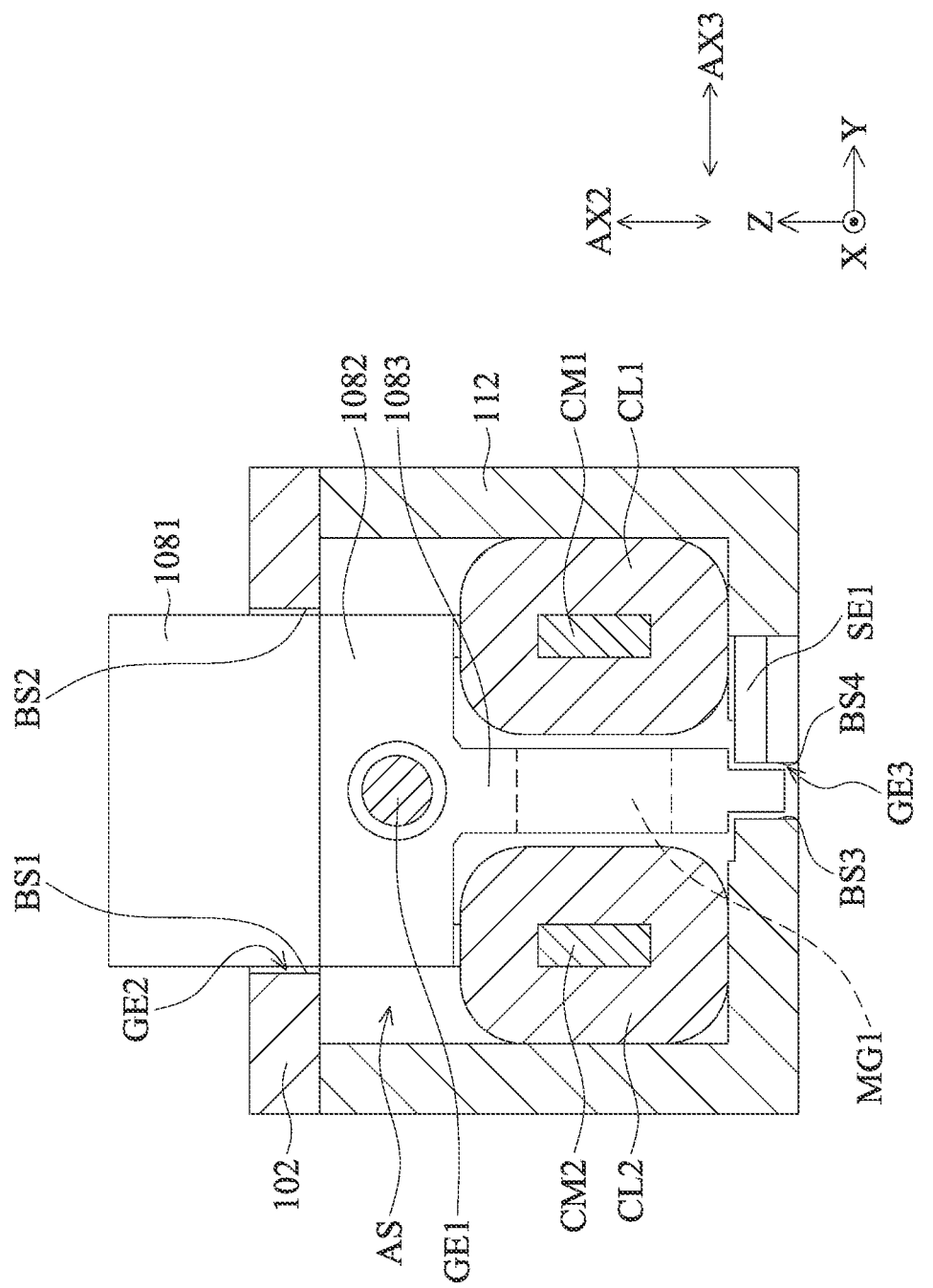
FIG. 3 shows a cross-sectional view of the optical element driving mechanism 100 along line A-A in FIG. 1 according to the embodiment of the present disclosure.

Please refer to FIG. 1 to FIG. 3. FIG. 1 shows a schematic diagram of an optical element driving mechanism 100 according to an embodiment of the present disclosure, FIG. 2 shows an exploded diagram of the optical element driving mechanism 100 according to the embodiment of the present disclosure, and FIG. 3 shows a cross-sectional view of the optical element driving mechanism 100 along line A-A in FIG. 1 according to the embodiment of the present disclosure. The optical element driving mechanism 100 can be an optical camera system and can be configured to hold and drive an optical element 200 or an optical system (such as a voice coil motor). The optical element driving mechanism 100 can be installed in different electronic devices or portable electronic devices, such as a smartphone, for allowing a user to perform the image capturing function.

In this embodiment, the optical element driving mechanism 100 may include a fixed assembly FA, a movable assembly MA, and a driving module DM. The movable assembly MA is movably connected to the fixed assembly FA. The driving module DM is configured to drive the movable assembly MA to move relative to the fixed assembly FA.

In this embodiment, as shown in FIG. 2, the fixed assembly FA includes an covering body 102 and a base 112. The movable assembly MA may include a movable part 108 and the optical element 200. In this embodiment, The movable part 108 may include a supporting platform 1081 configured to hold the optical element 200. The optical element 200 can be used as a light-shielding film or a shutter, but it is not limited thereto. In other embodiments, the optical element 200 can also be used as a filter or aperture, and so on.

The covering body 102 is fixedly disposed on the base 112. The covering body 102 can be combined with the base 112 to cooperatively form an accommodation space AS to accommodate the movable assembly MA and the driving module DM, and the movable part 108 is partially disposed in the accommodation space AS and is movable relative to the fixed assembly FA.

In addition, the optical element driving mechanism 100 may further include a guiding assembly GA configured to guide the movable part 108 to move along a first axis AX1 relative to the fixed assembly FA. It is worth noting that, in the present disclosure, there is no elastic element, such as a spring, disposed between the movable part 108 and the fixed assembly FA.

Figure 4:
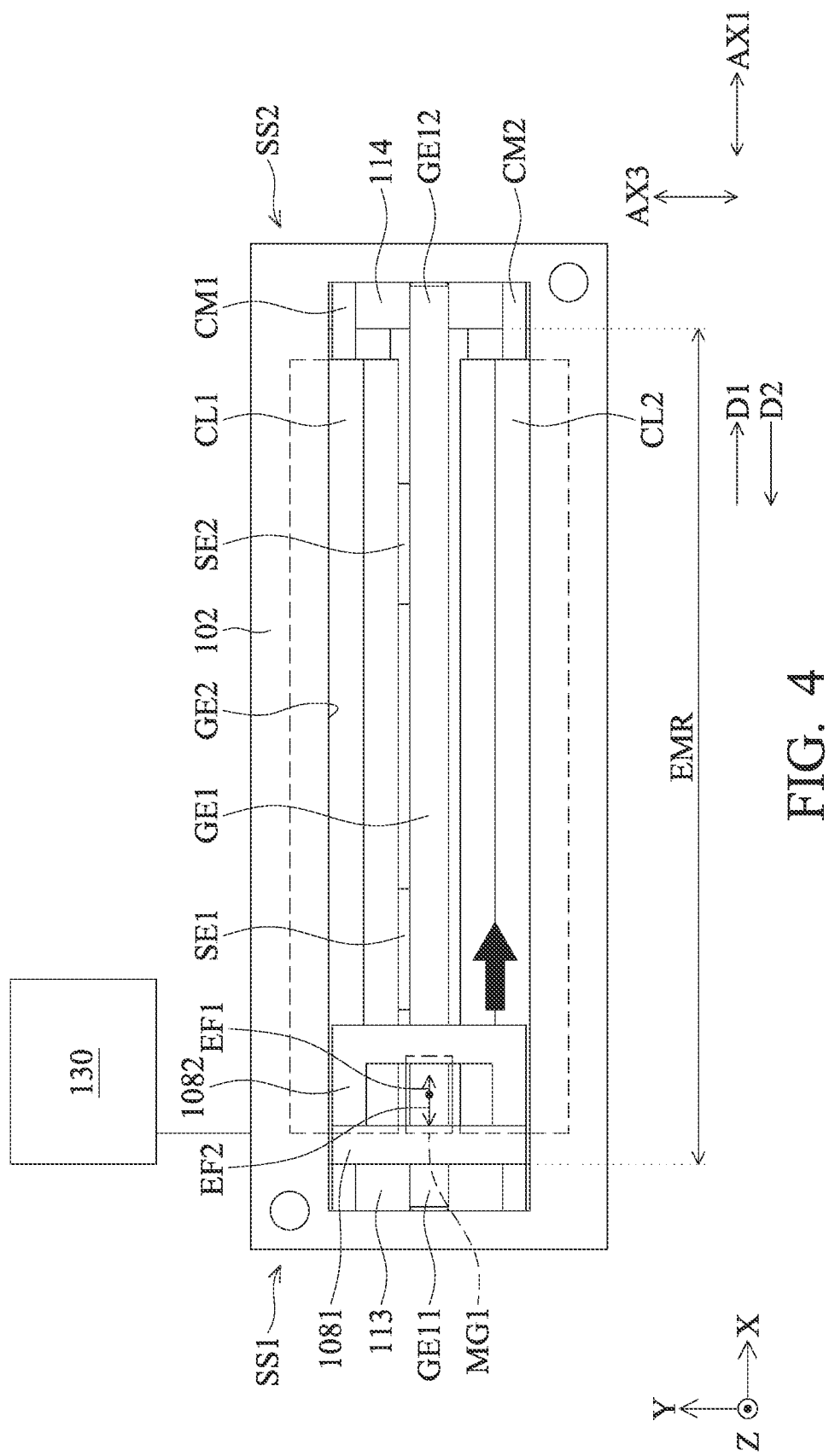
FIG. 4 is a top view of the optical element driving mechanism 100 according to an embodiment of the present disclosure.

Next, please refer to FIG. 1 to FIG. 4 together. FIG. 4 is a top view of the optical element driving mechanism 100 according to an embodiment of the present disclosure. In this embodiment, the driving module DM includes a first driving assembly DA1 configured to drive the movable part 108 to move along the first axis AX1 relative to the fixed assembly FA. In addition, the optical element driving mechanism 100 may further include a second driving assembly DA2, and the second driving assembly DA2 and the first driving assembly DA1 are configured to cooperatively drive the movable part 108 to move within an extreme motion range EMR (FIG. 4) relative to the fixed assembly FA.

For example, the first driving assembly DA1 and the second driving assembly DA2 are configured to drive the movable part 108 to move in a first direction D1 relative to the fixed assembly FA. In addition, the first driving assembly DA1 and the second driving assembly DA2 can also drive the movable part 108 to move in a second direction D2 relative to the fixed assembly FA. The first direction D1 and the second direction D2 are parallel to the first axis AX1, and the first direction D1 and the second direction D2 are opposite to each other.

The first driving assembly DA1 and the second driving assembly DA2 are configured to drive the movable part 108 to move from a preset position to a target position. For example, the preset position can be the leftmost position of the movable part 108 in FIG. 4, and the target position can be the rightmost position of the movable part 108 in FIG. 4, but it is not limited to this. For example, the preset position and the target position are positions in the extreme motion range EMR.

In this embodiment, the first driving assembly DA1 and the second driving assembly DA2 are disposed in the accommodation space AS. The first driving assembly DA1 includes a first coil CL1, a first magnetically conductive element CM1 and a first magnetic element MG1. The first magnetic element MG1 corresponds to the first coil CL1, and the first magnetically conductive element CM1 corresponds to the first coil CL1.

As shown in FIG. 2 to FIG. 4, the first magnetic element MG1 is disposed on an extending portion 1083 of the movable part 108, and the first coil CL1 surrounds the first magnetically conductive element CM1. For example, the first magnetically conductive element CM1 has a long strip-shaped structure, and the first magnetically conductive element CM1 extends along the first axis AX1.

Furthermore, the second driving assembly DA2 may include a second coil CL2 and a second magnetically conductive element CM2. The second coil CL2 corresponds to the first magnetic element MG1, and the second magnetically conductive element CM2 corresponds to the second coil CL2. The second coil CL2 surrounds the second magnetically conductive element CM2.

For example, the second magnetically conductive element CM2 has a long strip-shaped structure, and the second magnetically conductive element CM2 extends along the first axis AX1. It is worth noting that the permeability of the first magnetically conductive element CM1 is the same as the permeability of the second magnetically conductive element CM2, and the number of turns of the first coil CL1 is equal to the number of turns of the second coil CL2.

In addition, the size of the first magnetically conductive element CM1 is equal to the size of the second magnetically conductive element CM2, and the size of the first coil CL1 is also equal to the size of the second coil CL2. That is, the first magnetically conductive element CM1 and the second magnetically conductive element CM2 are the same element, and the first coil CL1 and the second coil CL2 are the same element. Therefore, when the first coil CL1 and the second coil CL2 receive currents having the same magnitude, the electromagnetic driving force generated by the first coil CL1 and the first magnetic element MG1 is the same as the electromagnetic driving force generated by the second coil CL2 and the first magnetic element MG1.

The guiding assembly GA includes a first guiding element GE1 configured to guide the movable part 108 to move along the first axis AX1 relative to the fixed assembly FA. The first guiding element GE1 has a long strip-shaped structure, such as a cylindrical structure, and the first guiding element GE1 extends along the first axis AX1. As shown in the figures, the first guiding element GE1 passes through the movable part 108, and the first guiding element GE1 is affixed to the base 112.

Furthermore, the guiding assembly GA may further include a second guiding element GE2 configured to guide the movable part 108 to move along the first axis AX1 relative to the fixed assembly FA. The second guiding element GE2 is formed on the covering body 102, and the second guiding element GE2 has a slot-shaped structure and extends along the first axis AX1.

In this embodiment, the movable part 108 further includes a base body 1082, and the supporting platform 1081 extends from the base body 1082 along a second axis AX2. The second axis AX2 is perpendicular to the first axis AX1.

As shown in FIG. 1 and FIG. 3, when viewed along the first axis AX1, the supporting platform 1081 protrudes from the slot-shaped structure (the second guiding element GE2). When viewed along a third axis AX3, the supporting platform 1081 protrudes from the slot-shaped structure. The third axis AX3 is perpendicular to the first axis AX1 and the second axis AX2.

Figure 5:
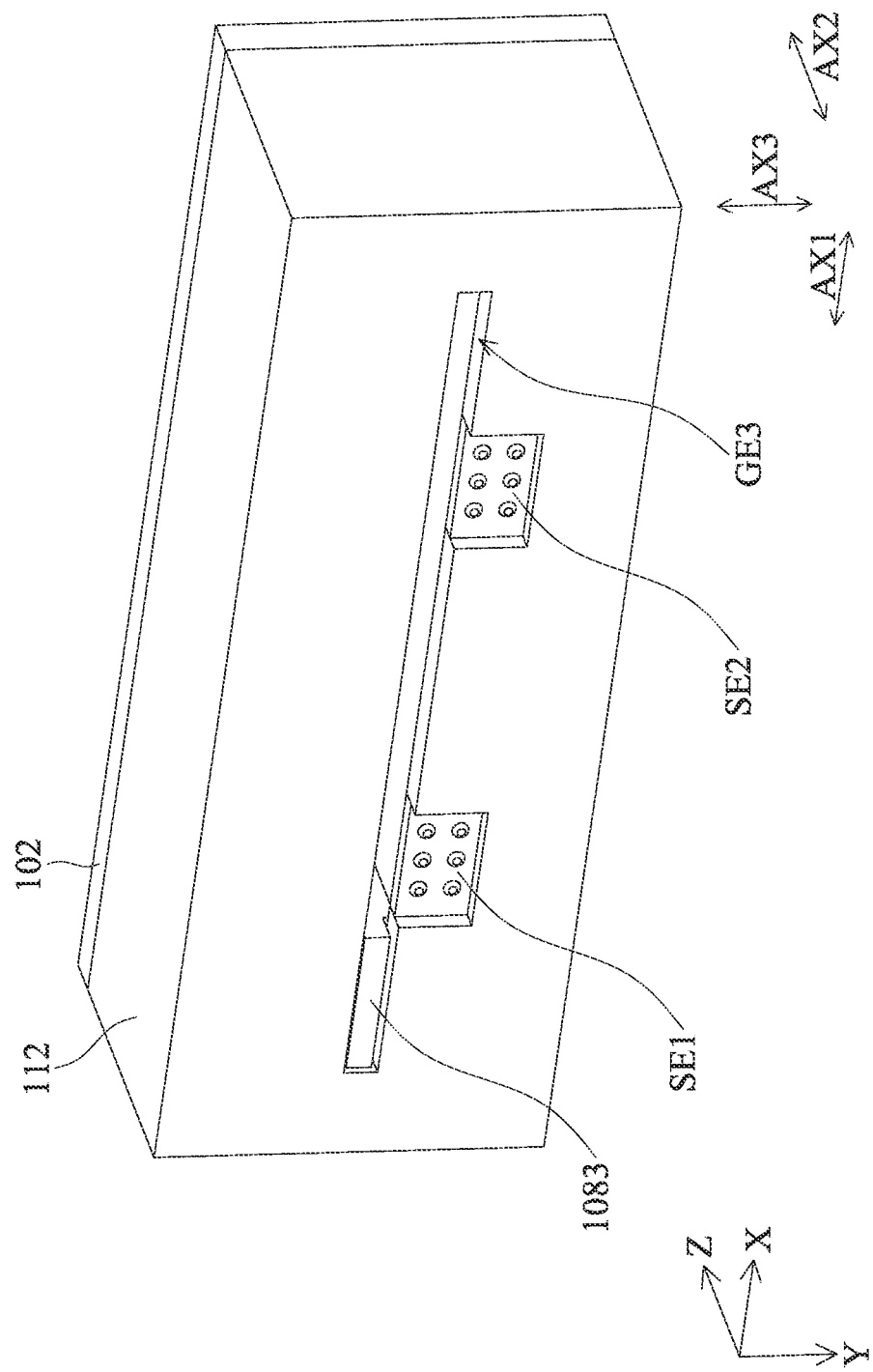
FIG. 5 is a schematic diagram of the optical element driving mechanism 100 in another view according to an embodiment of the present disclosure.

Please refer to FIG. 2 to FIG. 5. FIG. 5 is a schematic diagram of the optical element driving mechanism 100 in another view according to an embodiment of the present disclosure. As shown in FIG. 5, the guiding assembly GA further includes a third guiding element GE3 configured to guide the movable part 108 to move along the first axis AX1 relative to the fixed assembly FA.

The third guiding element GE3 is formed on the base 112, and the third guiding element GE3 has a slit structure and extends along the first axis AX1. As shown in FIG. 2 and FIG. 5, the movable part 108 further includes an extending portion 1083, and the extending portion 1083 extends from the base body 1082 along the second axis AX2.

As shown in FIG. 3, when viewed along the third axis AX3, the extending portion 1083 does not protrude from the slit structure. When viewed along the third axis AX3, the slit structure overlaps at least a part of the extending portion 1083.

Furthermore, the optical element driving mechanism 100 further includes a first blocking surface BS1 and a second blocking surface BS2 located on the covering body 102 and configured to be in contact with the supporting platform 1081 to prevent the movable part 108 from rotating around the first axis AX1. The slot-shaped structure can be formed by the first blocking surface BS1 and the second blocking surface BS2.

The optical element driving mechanism 100 further includes a third blocking surface BS3 and a fourth blocking surface BS4 located on the base 112 and configured to be in contact with the extending portion 1083 to prevent the movable part 108 from rotating around the first axis AX1. The slit structure can be formed by the third blocking surface BS3 and the fourth blocking surface BS4.

Based on the design of the first blocking surface BS1 to the fourth blocking surface BS4, it can be ensured that the movable part 108 moves stably along the first axis AX1 and does not rotate around the first axis AX1.

Furthermore, as shown in FIG. 2 and FIG. 4, the optical element driving mechanism 100 further includes a first limiting portion 113 and a second limiting portion 114 configured to limit the movable part 108 to move within the extreme motion range EMR. The first limiting portion 113 and the second limiting portion 114 are respectively disposed on a first side SS1 and a second side SS2 of the base 112.

As shown in FIG. 4, a first end GE11 and a second end GE12 of the first guiding element GE1 are respectively fixedly disposed on the first limiting portion 113 and the second limiting portion 114. For example, they are fixed by glue.

In addition, the optical element driving mechanism 100 further includes a sensing assembly SA configured to sense the position of the movable part 108 relative to the fixed assembly FA. The sensing assembly SA includes a first sensing element SE1, which is disposed on the base 112 and located on the first side SS1. The sensing assembly SA further includes a second sensing element SE2, which is disposed on the base 112 and located on the second side SS2. As shown in FIG. 5, the first sensing element SE1 and the second sensing element SE2 are adjacent to the slit structure.

The first sensing element SE1 and the second sensing element SE2 may include a Hall sensor, a magnetoresistance effect sensor (MR sensor), a giant magnetoresistance effect sensor (GMR sensor), a tunneling magnetoresistance effect sensor (TMR sensor), or a fluxgate sensor.

As shown in FIG. 4, when viewed along the second axis AX2, the first guiding element GE1 is located between the first coil CL1 and the second coil CL2. When viewed along the second axis AX2, the movable part 108 overlaps at least a part of the first coil CL1 and the second coil CL2.

When viewed along the second axis AX2, the first coil CL1 does not overlap the first limiting portion 113 and the second limiting portion 114. When viewed along the second axis AX2, the second coil CL2 does not overlap the first limiting portion 113 and the second limiting portion 114.

As shown in FIG. 3, when viewed along the first axis AX1, the extending portion 1083 is located between the first coil CL1 and the second coil CL2. When viewed along the first axis AX1, the first magnetic element MG1 is located between the first coil CL1 and the second coil CL2.

Figure 6:
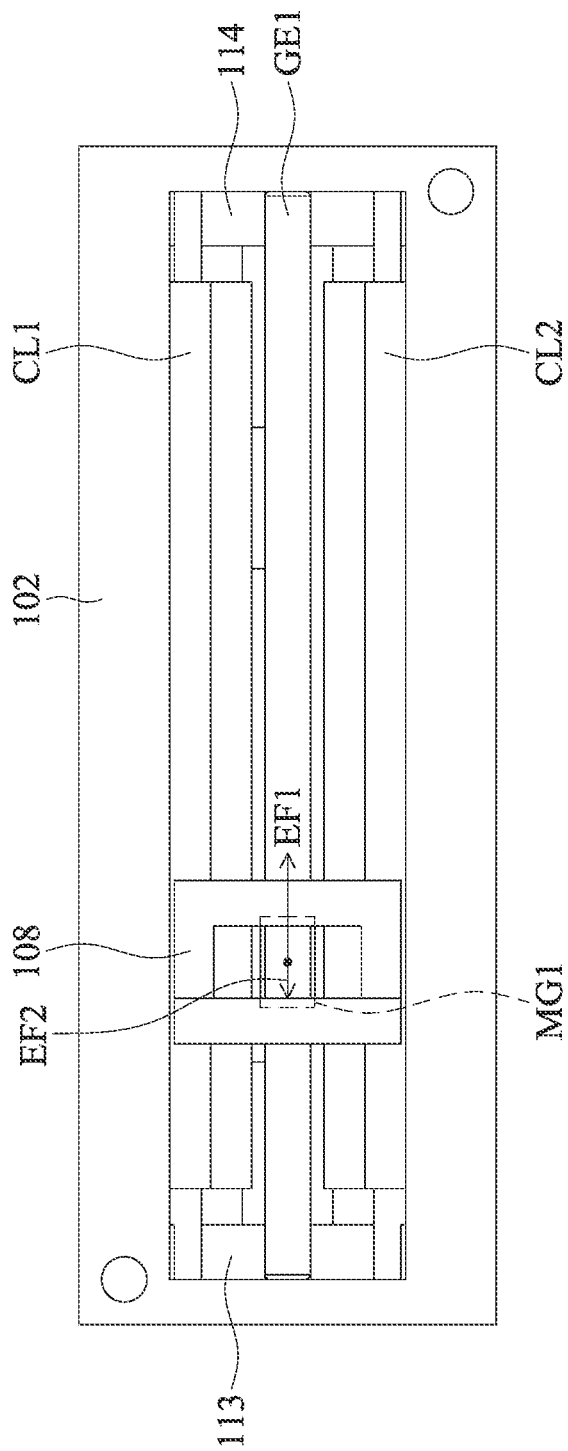
FIG. 6 to FIG. 8 are top views illustrated that the movable part 108 of the optical element driving mechanism 100 moves to different positions according to an embodiment of the present disclosure.
Figure 7:
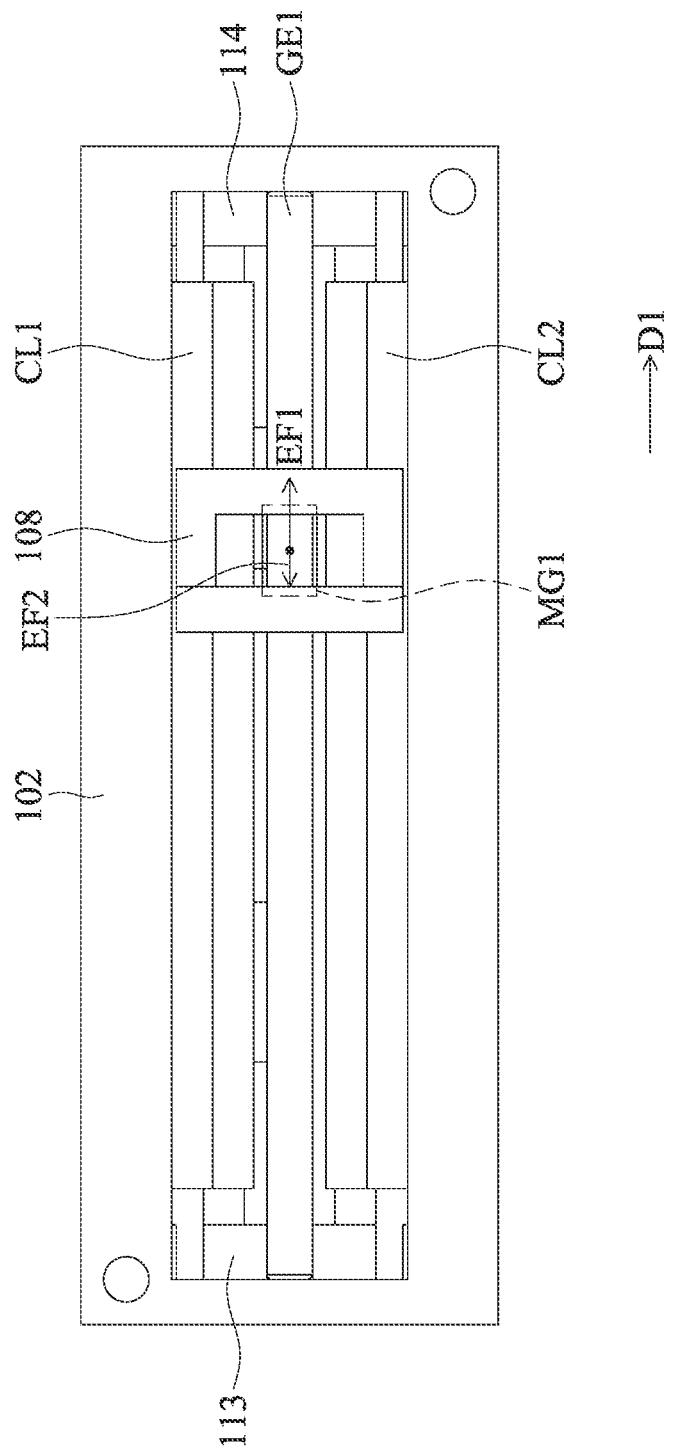
Figure 8:
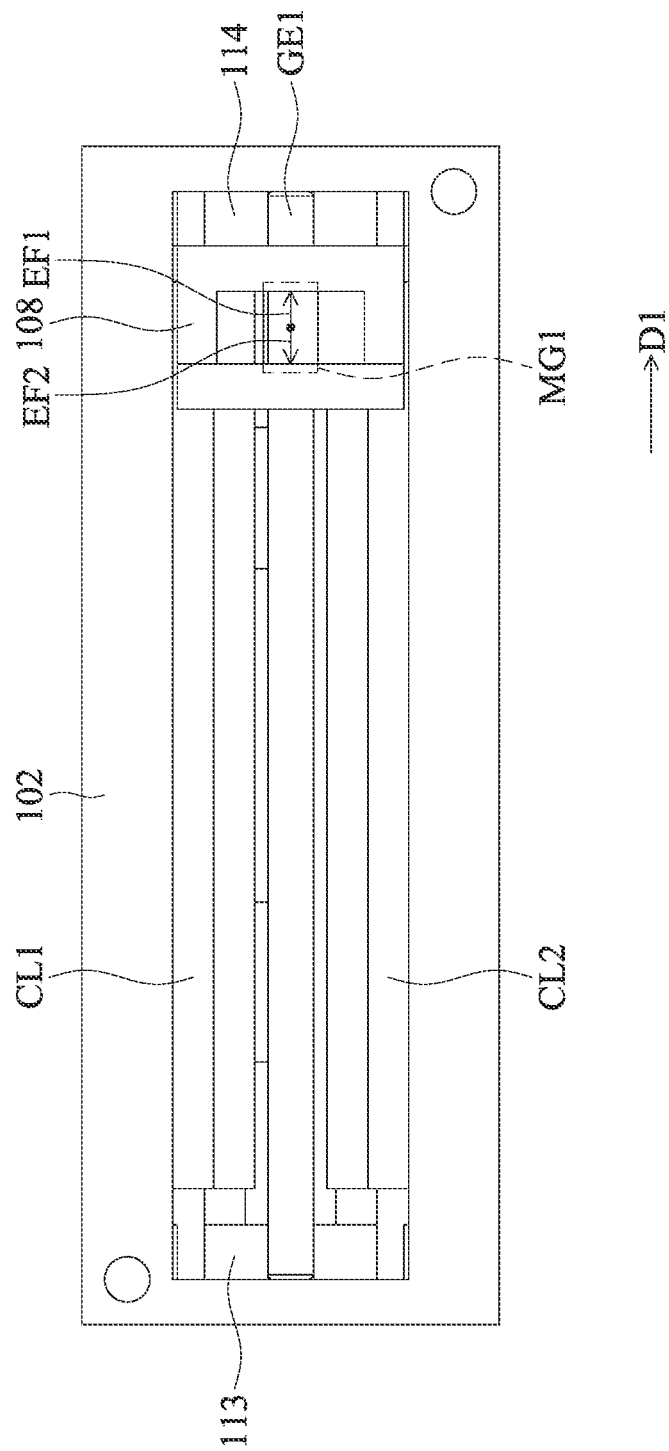
Figure 9:
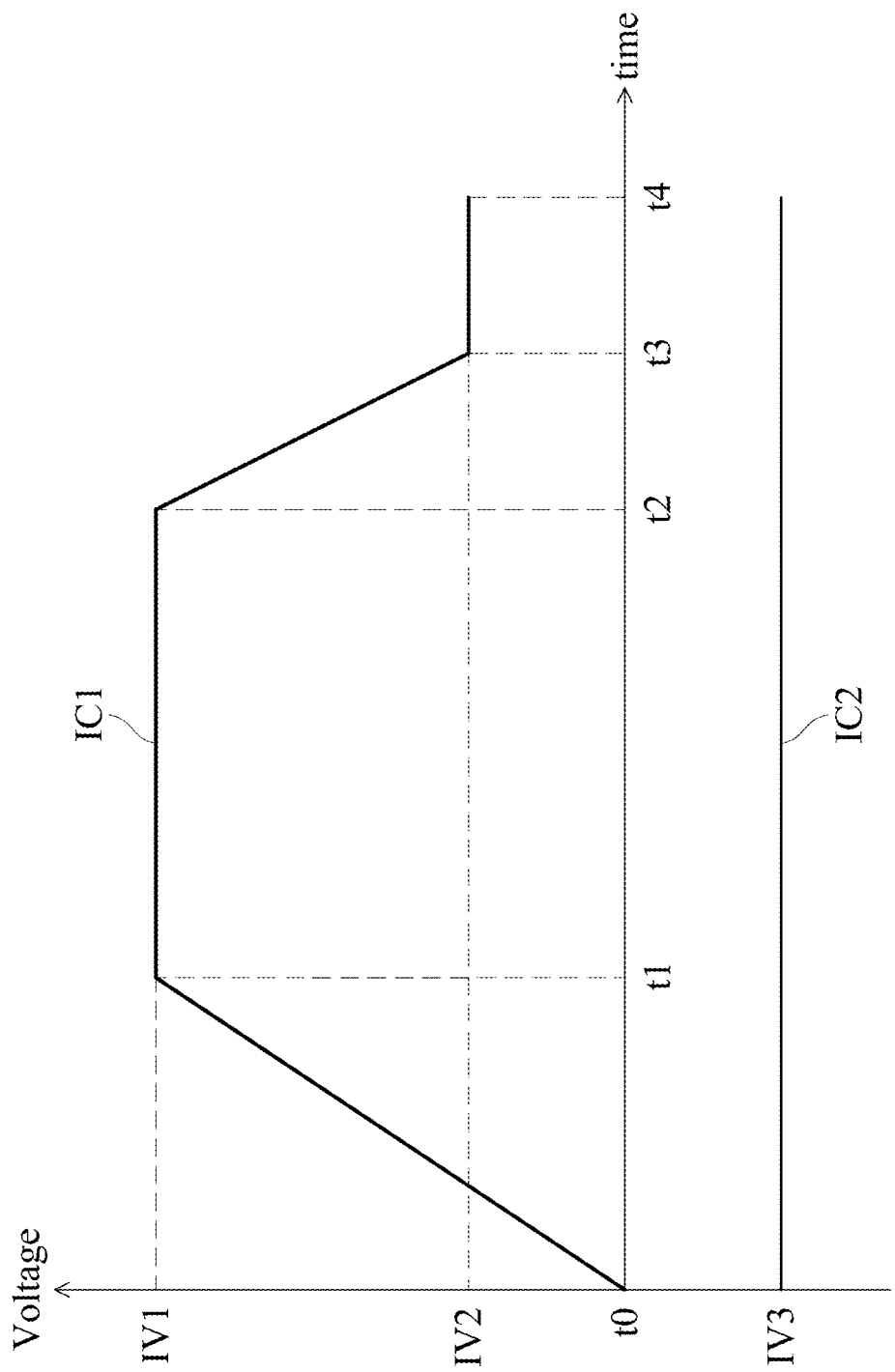
FIG. 9 is a graph of the relationship between currents received by the first coil CL1 and the second coil CL2 and time according to an embodiment of the present disclosure.

Next, the process of moving the movable part 108 from the preset position to the target position are described. Please refer to FIG. 4 and FIG. 6 to FIG. 9. FIG. 6 to FIG. 8 are top views illustrated that the movable part 108 of the optical element driving mechanism 100 moves to different positions according to an embodiment of the present disclosure, and FIG. 9 is a graph of the relationship between currents received by the first coil CL1 and the second coil CL2 and time according to an embodiment of the present disclosure.

In the present disclosure, the optical element driving mechanism 100 further includes a control circuit 130 configured to control the first driving assembly DA1 and the second driving assembly DA2, thereby controlling the position of the movable part 108 relative to the base 112. For example, as shown in FIG. 4 and FIG. 9, the first driving assembly DA1 provides a first electromagnetic driving force EF1 to drive the movable part 108 to start moving from an initial time point t0. At the initial time point t0, the movable part 108 is located at the leftmost position (the preset position) in FIG. 4.

Next, the movable part 108 starts to move rightward. Between the initial time point t0 and a first time point t1, the control circuit 130 provides a first current IC1 to the first coil CL1, so that the first coil CL1 and the first magnetic element MG1 generate the first electromagnetic driving force EF1. As shown in FIG. 9, the current value of the first current IC1 linearly increases from zero to a first current value IV1. In this embodiment, at the first time point t1, the movable part 108 is located at the position shown in FIG. 6, for example.

Between the first time point t1 and a second time point t2, the first current IC1 is maintained at the first current value IV1. That is, the first current value IV1 is a constant value, so that the first electromagnetic driving force EF1 is also a constant value correspondingly and continues to drive the movable part 108 to move rightward along the first direction D1.

Then, at the second time point t2, the movable part 108 moves to a close position, for example, the position in FIG. 7. The distance between the close position and the target position is, for example, 5 to 10% of the extreme motion range EMR.

Between the second time point t2 and a third time point t3, the current value of the first current IC1 linearly decreases from the first current value IV1 to a second current value IV2. In this embodiment, the first current value IV1 is at least twice, such as three times, the second current value IV2, but it is not limited thereto. During this time period, the moving speed of the movable part 108 decreases.

At the third time point t3, the movable part 108 reaches the target position and does not exceed the target position. That is, the movable part 108 does not hit the second limiting portion 114. After that, between the third time point t3 and a fourth time point t4, the first current IC1 is maintained at the second current value IV2.

On the other hand, during the movement of the movable part 108, the control circuit 130 is configured to provide a second current IC2 to the second coil CL2, so that the second coil CL2 and the first magnetic element MG1 generate a second electromagnetic driving force EF2, and the direction of the second electromagnetic driving force EF2 is opposite to the direction of the first electromagnetic driving force EF1.

As shown in FIG. 9, between the initial time point t0 and the fourth time point t4, the second current IC2 is maintained at a third current value IV3. The third current value IV3 is a constant value. That is, the second electromagnetic driving force EF2 is also a constant value. At the third time point t3, the third current value IV3 and the second current value IV2 have the same magnitude, but their phases are opposite. Therefore, at this time, the first electromagnetic driving force EF1 and the second electromagnetic driving force EF2 have the same magnitude but opposite directions, so that the movable part 108 can be fixed at the target position.

Based on the design of this embodiment, the second electromagnetic driving force EF2 provided by the second coil CL2 can serve as a spring, and it is not necessary to dispose a physical spring on the moving path of the movable part 108, so that the moving distance of the movable part 108 can be increased. For example, the optical element 200 carried by the movable part 108 is an optical lens, and therefore the design of the present disclosure can increase the focal length of the optical lens and reduce the cost.

Figure 10:
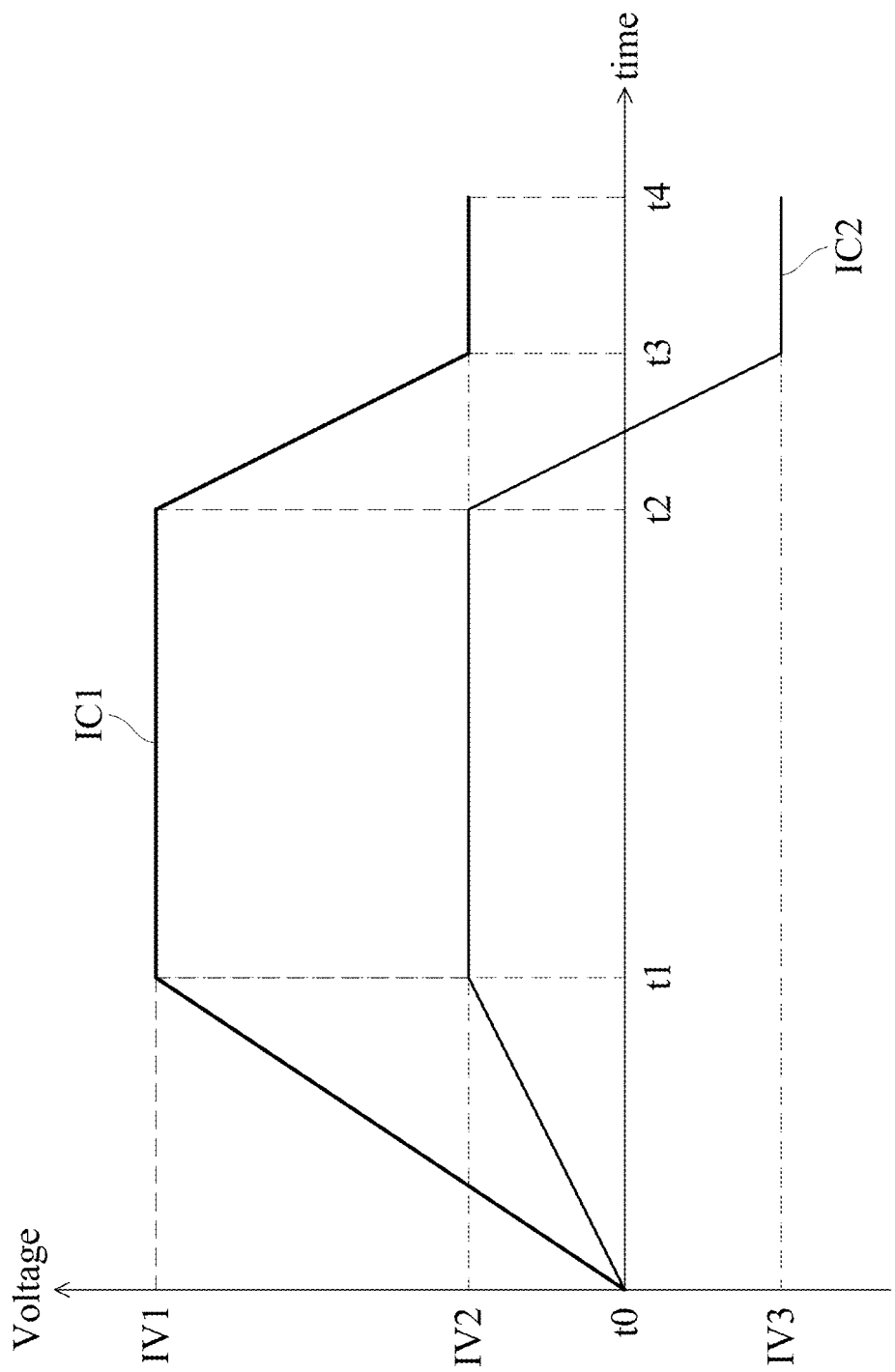
FIG. 10 is a graph of the relationship between the currents received by the first coil CL1 and the second coil CL2 and time according to an embodiment of the present disclosure.
Figure 11:
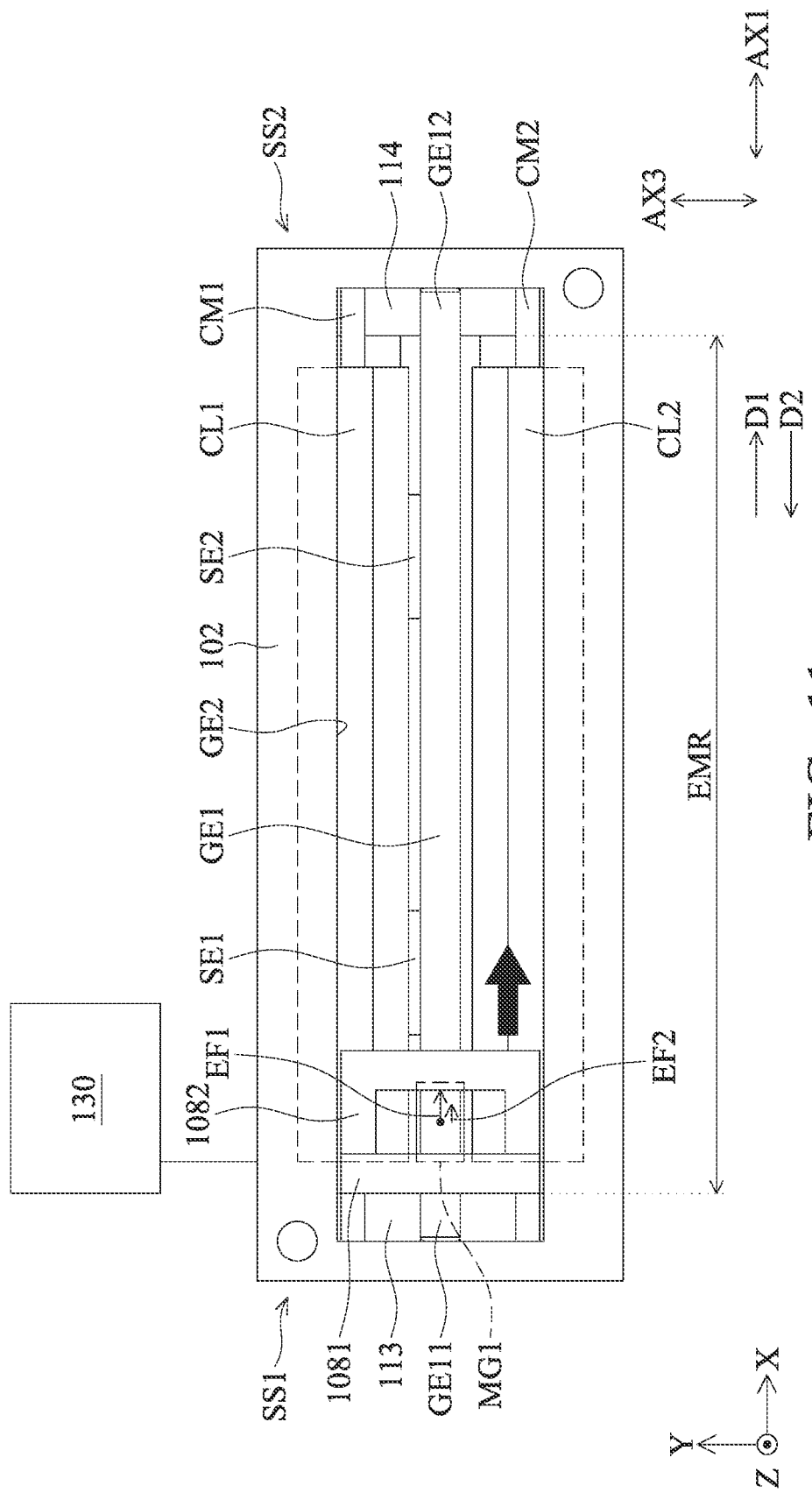
FIG. 11 to FIG. 13 are top views illustrated that the movable part 108 of the optical element driving mechanism 100 moves to different positions according to an embodiment of the present disclosure.
Figure 12:
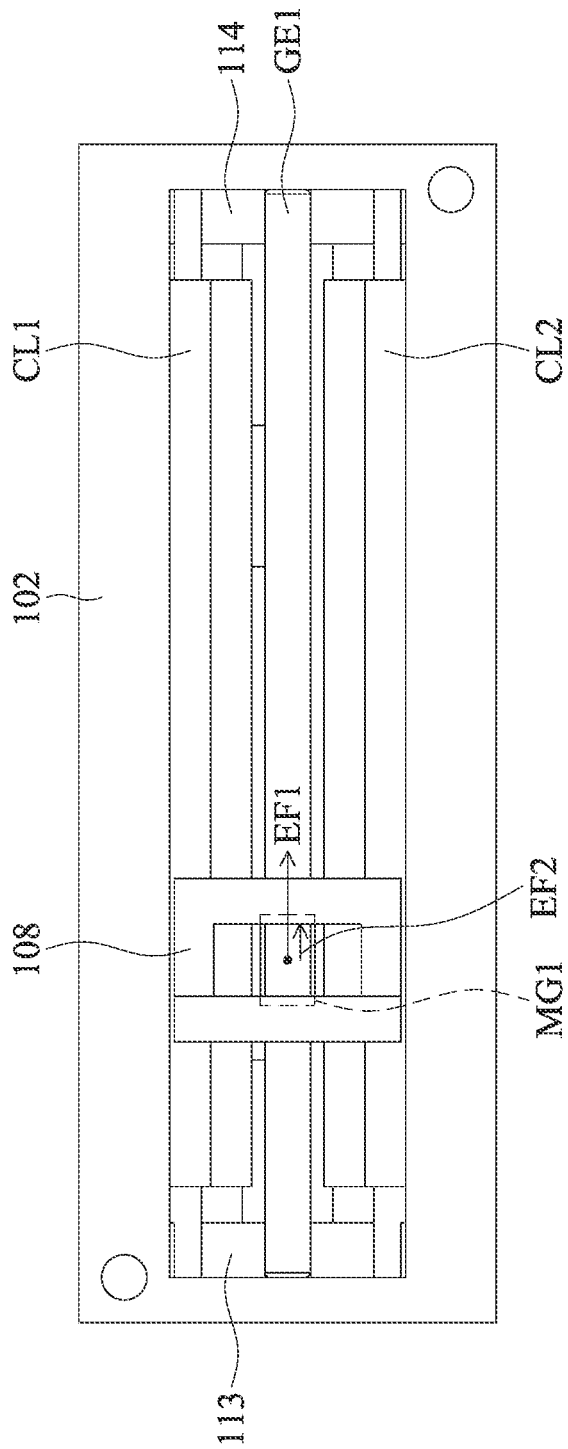
Figure 13:
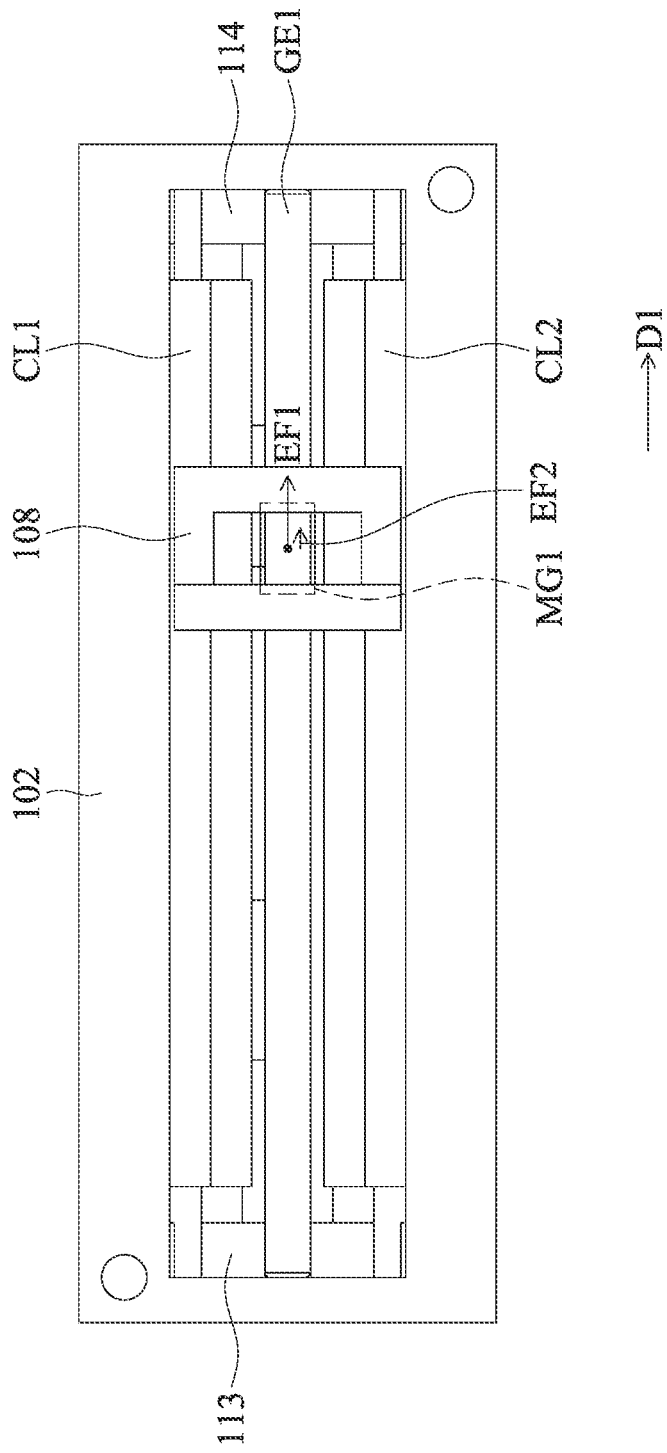

Please refer to FIG. 10 to FIG. 13 and FIG. 8. FIG. 10 is a graph of the relationship between the currents received by the first coil CL1 and the second coil CL2 and time according to an embodiment of the present disclosure, and FIG. 11 to FIG. 13 are top views illustrated that the movable part 108 of the optical element driving mechanism 100 moves to different positions according to an embodiment of the present disclosure. In this embodiment, the first driving assembly DA1 and the second driving assembly DA2 cooperatively drive the movable part 108 to start moving from the initial time point t0. The change of the first current IC1 received by the first coil CL1 can be the same as that in the foregoing embodiment, so it is not repeated herein.

Between the initial time point t0 and the first time point t1, the control circuit 130 provides the second current IC2 to the second coil CL2 to generate the second electromagnetic driving force EF2, and the direction of the second electromagnetic driving force EF2 is the same as the direction of the first electromagnetic driving force EF1, as shown in FIG. 11. In addition, the current value of the second current IC2 linearly increases from zero to the second current value IV2. In this embodiment, at the first time point t1, the movable part 108 is located at the position shown in FIG. 12, for example.

Between the first time point t1 and the second time point t2, the second current IC2 is maintained at the second current value IV2. That is, the second electromagnetic driving force EF2 is also a constant value, and the second electromagnetic driving force EF2 is less than the first electromagnetic driving force EF1.

Then, at the second time point t2, the movable part 108 moves to a close position, for example, the position in FIG. 13. The distance between the close position and the target position is, for example, 5 to 15% of the extreme motion range EMR, but it is not limited thereto.

Between the second time point t2 and the third time point t3, the current value of the second current IC2 linearly decreases from the second current value IV2 to the third current value IV3. At the third time point t3, the third current value IV3 and the second current value IV2 have the same magnitude but their phases are opposite. Therefore, at this time, the first electromagnetic driving force EF1 and the second electromagnetic driving force EF2 have the same magnitude but opposite directions, so that the movable part 108 can be fixed at the target position, as shown in FIG. 8.

Finally, between the third time point t3 and the fourth time point t4, the second current IC2 is maintained at the third current value IV3.

Specifically, after the movable part 108 moves to the target position, the control circuit 130 continues to provide the first current IC1 to the first coil CL1, and the first current IC1 is maintained at the second current value IV2. After the movable part 108 moves to the target position, the control circuit 130 continues to provide the second current IC2 to the second coil CL2, and the second current IC2 is maintained at the third current value IV3. Thus, the movable part 108 can be stably fixed at the target position.

In summary, the present disclosure provides an optical element driving mechanism, which includes a movable part, a fixed assembly, a first and a second driving assemblies and a guiding assembly. The movable part is configured to be connected to an optical element. The first and second driving assemblies are configured to drive the movable part to move along the first direction or the second direction relative to the fixed assembly. The guiding assembly is configured to guide the movable part to move along the first axis relative to the fixed assembly.

In the present disclosure, no elastic element is provided between the movable part and the fixed assembly. Furthermore, in some embodiments, the second driving assembly continuously provides a constant second electromagnetic driving force at any time point. Based on this configuration, the second electromagnetic driving force can serve as a spring, and it is not necessary to dispose a physical spring on the moving path of the movable part, so that the moving distance of the movable part can be increased, and the cost can also be reduced.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, comprising:
   a movable part configured to be connected to an optical element;
   a fixed assembly having an accommodating space, wherein the movable part is partially disposed in the accommodating space and is movable relative to the fixed assembly;
   a first driving assembly configured to drive the movable part to move relative to the fixed assembly, wherein the first driving assembly comprises a first coil and a first magnetic element corresponding to the first coil, and the first coil has a first winding axis;
   a second driving assembly configured to drive the movable part to move relative to the fixed assembly, wherein the second driving assembly comprises a second coil corresponding to the first magnetic element, and the second coil has a second winding axis; and
   a guiding assembly configured to guide the movable part to move along a first axis relative to the fixed assembly;
   wherein the first winding axis and the second winding axis are parallel to the first axis, the first magnetic element is disposed on the movable part and corresponds to the first coil and the second coil, and the first magnetic element is located between the first coil and the second coil when viewed along the first axis;
   wherein there is no elastic element disposed between the movable part and the fixed assembly;
   wherein the guiding assembly comprises a first guiding element configured to guide the movable part to move along the first axis relative to the fixed assembly;
   the first guiding element has a long strip-shaped structure;
   the first guiding element extends along the first axis;
   the first guiding element passes through the movable part;
   the fixed assembly comprises a base; and
   the first guiding element is affixed to the base.

2. The optical element driving mechanism as claimed in claim 1, wherein the second driving assembly and the first driving assembly are configured to cooperatively drive the movable part to move within an extreme motion range relative to the fixed assembly;
   the first driving assembly and the second driving assembly are configured to drive the movable part to move in a first direction relative to the fixed assembly;

the first driving assembly and the second driving assembly are configured to drive the movable part to move in a second direction relative to the fixed assembly;

the first direction and the second direction are both parallel to the first axis; and wherein the optical element driving mechanism further comprises a first limiting portion and a second limiting portion, and the first limiting portion and the second limiting portion are respectively disposed on a first side and a second side of the base to define the extreme motion range.

3. The optical element driving mechanism as claimed in claim 2, wherein the first direction and second direction are opposite to each other;

the first driving assembly and the second driving assembly are configured to drive the movable part to move from a preset position to a target position; and the preset position and the target position are within the extreme motion range.

4. The optical element driving mechanism as claimed in claim 3, wherein the movable part comprises a supporting platform configured to hold the optical element;

the fixed assembly comprises a covering body;

the covering body is disposed on the base to form the accommodation space.

5. The optical element driving mechanism as claimed in claim 4, wherein the guiding assembly further comprises a second guiding element configured to guide the movable part to move along the first axis relative to the fixed assembly;

the second guiding element is formed on the covering body;

the second guiding element has a slot-shaped structure and extends along the first axis;

the movable part further comprises a base body, and the supporting platform is extended from the base body along a second axis; and the second axis is perpendicular to the first axis.

6. The optical element driving mechanism as claimed in claim 5, wherein when viewed along the first axis, the supporting platform protrudes from the slot-shaped structure;

when viewed along a third axis, the supporting platform protrudes from the slot-shaped structure; and the third axis is perpendicular to the first axis and the second axis.

7. The optical element driving mechanism as claimed in claim 6, wherein the guiding assembly further comprises a third guiding element configured to guide the movable part to move along the first axis relative to the fixed assembly;

the third guiding element is formed on the base; and the third guiding element has a slit structure and extends along the first axis.

8. The optical element driving mechanism as claimed in claim 7, wherein the movable part further comprises an extending portion, and the extending portion is extended from the base body along the second axis;

when viewed along the third axis, the extending portion does not protrude from the slit structure; and when viewed along the third axis, the slit structure overlaps at least a part of the extending portion.

9. The optical element driving mechanism as claimed in claim 8, wherein the first driving assembly and the second driving assembly are disposed in the accommodation space;

the first driving assembly comprises:

a first magnetically conductive element corresponding to the first coil;

wherein the first magnetic element is disposed on the extending portion;

the first coil surrounds the first magnetically conductive element;

the first magnetically conductive element has a long strip-shaped structure; and the first magnetically conductive element extends along the first axis.

10. The optical element driving mechanism as claimed in claim 9, wherein the second driving assembly comprises:

a second magnetically conductive element corresponding to the second coil;

wherein the second coil surrounds the second magnetically conductive element;

the second magnetically conductive element has a long strip-shaped structure;

the second magnetically conductive element extends along the first axis;

a permeability of the first magnetically conductive element is the same as a permeability of the second magnetically conductive element; and a number of turns of the first coil is equal to a number of turns of the second coil.

11. The optical element driving mechanism as claimed in claim 10, wherein the first limiting portion and the second limiting portion are configured to limit the movable part to move within the extreme motion range;

a first end and a second end of the first guiding element are respectively fixedly disposed on the first limiting portion and the second limiting portion.

12. The optical element driving mechanism as claimed in claim 11, wherein the optical element driving mechanism further comprises a sensing assembly configured to sense a position of the movable part relative to the fixed assembly;

the sensing assembly comprises a first sensing element disposed on the base and located on the first side;

the sensing assembly comprises a second sensing element disposed on the base and located on the second side; and the first sensing element and the second sensing element are adjacent to the slit structure.

13. The optical element driving mechanism as claimed in claim 1, wherein the movable part comprises a base body and an extending portion, the extending portion is extended from the base body along a second axis, and the second axis is perpendicular to the first axis.

14. The optical element driving mechanism as claimed in claim 12, wherein when viewed along the second axis, the first guiding element is located between the first coil and the second coil;

when viewed along the second axis, the movable part overlaps at least a part of the first coil and the second coil;

when viewed along the second axis, the first coil does not overlap the first limiting portion and the second limiting portion;

when viewed along the second axis, the second coil does not overlap the first limiting portion and the second limiting portion;

when viewed along the first axis, the extending portion is located between the first coil and the second coil; and when viewed along the first axis, the first magnetic element is located between the first coil and the second coil.

15. The optical element driving mechanism as claimed in claim 14, wherein the optical element driving mechanism further comprises a first blocking surface and a second blocking surface located on the covering body and configured to be in contact with the supporting platform to prevent the movable part from rotating around the first axis; and the optical element driving mechanism further comprises a third blocking surface and a fourth blocking surface located on the base and configured to be in contact with the extending portion to prevent the movable part from rotating around the first axis.

16. The optical element driving mechanism as claimed in claim 15, wherein the optical element driving mechanism further comprises a control circuit configured to control the first driving assembly and the second driving assembly;

the first driving assembly drives the movable part to start moving from an initial time point;

between the initial time point and a first time point, the control circuit provides a first current to the first coil, and a current value of the first current linearly increases from zero to a first current value;

between the first time point and a second time point, the first current is maintained at the first current value;

at the second time point, the movable part moves to a close position; and a distance between the close position and the target position is 5 to 10% of the extreme motion range.

17. The optical element driving mechanism as claimed in claim 16, wherein between the second time point and a third time point, the current value of the first current linearly decreases from the first current value to a second current value;

the first current value is at least twice the second current value;

at the third time point, the movable part reaches the target position and does not exceed the target position; and between the third time point and a fourth time point, the first current is maintained at the second current value.

18. The optical element driving mechanism as claimed in claim 17, wherein the control circuit is configured to provide a second current to the second coil;

between the initial time point and the fourth time point, the second current is maintained at a third current value; and the third current value and the second current value have the same magnitude, but phases of the third current value and the second current value are opposite.

19. The optical element driving mechanism as claimed in claim 17, wherein the second driving assembly drives the movable part to start moving from the initial time point;

between the initial time point and the first time point, the control circuit provides a second current to the second coil, and a current value of the second current linearly increases from zero to the second current value;

between the first time point and a second time point, the second current is maintained at the second current value;

between the second time point and the third time point, the current value of the second current linearly decreases from the second current value to a third current value;

between the third time point and the fourth time point, the second current is maintained at the third current value; and the third current value and the second current value have the same magnitude, but the phases of the third current value and the second current value are opposite.

20. The optical element driving mechanism as claimed in claim 19, wherein after the movable part moves to the target position, the control circuit continues to provide the first current to the first coil, and the first current is maintained at the second current value; and after the movable part moves to the target position, the control circuit continues to provide the second current to the second coil, and the second current is maintained at the third current value.

* * * * *